United States Patent [19]
Dalle et al.
[11] 4,000,027
[45] Dec. 28, 1976

[54] PROCESS OF MANUFACTURING PANELS COMPOSED OF UNITS IN, FOR EXAMPLE, CERAMIC, ASSEMBLED BY A THERMOPLASTIC MATERIAL

[75] Inventors: Jean-Paul Dalle; Joseph Davidovits, both of St.-Quentin, France

[73] Assignee: Omnium de Prospective Industrielle, S.A., Neuville-Saint-Amand, France

[22] Filed: Oct. 20, 1972

[21] Appl. No.: 299,579

[30] Foreign Application Priority Data

Oct. 21, 1971 France ............................ 71.37940

[52] U.S. Cl. ................................ 156/73.6; 52/389; 156/383; 156/298; 264/64; 264/271; 264/261; 428/44; 428/47; 264/DIG. 31

[51] Int. Cl. ........................ B32b 31/00; C09j 5/06

[58] Field of Search ............ 156/73, 283, 297, 298, 156/299, 63, 245, 89; 161/37, 46; 264/70, 261, 263, DIG. 31, 64, 271; 52/35, 259, 389, 388

[56] References Cited

UNITED STATES PATENTS

| | | | |
|---|---|---|---|
| 3,170,808 | 2/1965 | Almy et al. | 117/20 |
| 3,239,981 | 3/1966 | Fitzgerald | 52/309 |
| 3,754,065 | 8/1973 | Hofmann et al. | 156/73 |

FOREIGN PATENTS OR APPLICATIONS

| | | | |
|---|---|---|---|
| 1,290,058 | 2/1962 | France | |
| 45-21310 | 7/1970 | Japan | 156/283 |

*Primary Examiner*—Charles E. Van Horn
*Assistant Examiner*—J. J. Gallagher
*Attorney, Agent, or Firm*—Curtis, Morris & Safford

[57] ABSTRACT

This invention concerns a process of manufacturing panels composed of units in, for example, ceramic assembled by a thermoplastic material.

The interstitial spaces between the units are filled with granules of thermoplastic material. After heating to the highest possible temperature but just lower than the degradation temperature, the units are firmly joined to one another.

Such panels can be used as decorative floor or wall-coverings.

15 Claims, No Drawings

PROCESS OF MANUFACTURING PANELS COMPOSED OF UNITS IN, FOR EXAMPLE, CERAMIC, ASSEMBLED BY A THERMOPLASTIC MATERIAL

We already know about various manufacturing processes for coverings composed of units assembled by a material. Generally speaking the component members are arranged on a temporary support, such as a sheet of paper, and interstitial spaces are arranged between the units, according to the shape of the latter and the desired decorative effect.

An initial process utilized, especially for the realization of coverings composed of ceramic units, consists in placing the units on a slab of freshly poured cement, the temporary paper support being placed on the opposite side to that of the cement slab. When the latter has set, the units having become slightly embedded in the cement, we remove the temporary support and then proceed to making the joints between the units. This series of operations is quite long, and as a result, fairly burdensome.

Improvements in the making of such coverings have already been tried by the manufacture of previously jointed panels, obtained by soaking the units in a thermoplastic material to be injected or in rubber which can be vulcanized. Nevertheless, if the interstices between the elements are correctly filled on injection, the thermoplastic material will have to be spread all over the side of the panel which will, subsequently, not be in view. Such panels are then stuck onto a slab using all the proper methods. Such a procedure is certainly more economic than the former, but we find, from experience, that, the units are badly attached to the thermoplastic material and become easily detached.

The French patents Nos. 1,345,842 and 1,448,901 disclose panels of pre-joined units, in which only the joins are filled with thermoplastic material, the upper and lower parts of the units being, however, free of this material.

French Patent No. 1,448,901 shows a priority claim stating (in translation):

(Patent application deposited in the United States of America June 18, 1964, under the Ser. No. 376,175, in the name of Mr. John V. FITZGERALD).

said U.S. application now issued as U.S. Pat. No. 3,319,392 on May 16, 1967. French patent No. 1,345,842 shows a priority claim stating (in translation):

(Patent application deposited in the United States of America Dec. 12, 1961, under the Ser. No. 158,809, in the name of Mr. John V. FITZGERALD.)

said U.S. application now issued as U.S. Pat. No. 3,239,981 on Mar. 15, 1966. French patent No. 1,448,901 also states (in translation):

The present invention relates to prefabricated multiple ceramic tile panels, and similar structural members suitable for use as surface coverings, space dividers, countertops, fenestrations, and the like.

The invention is more particularly directed to a prefabricated surfacing unit, or tessella, composed of a plurality of ceramic tile or tessera, linked together by means of a thin, water impermeable, chemically resistant, plastic web to provide a relatively smooth, continuous front surface and a back surface characterized by a network of interconnecting, open channels extending between the lateral edges of the tile pieces below the web.

and:

Because of the foregoing difficulties, cermic tile is ordinarily manufactured in relatively small sizes. Thus, the size of ceramic pieces rarely exceeds about 348 $cm^2$ (22.9 × 15.2 cm) and is usually equal to or less than about 109.7 $cm^2$ for glazed wall tile. Ceramic mosaics are usually 2.5 × 2.5 cm. The thickness of the tile is almost always less than about 1.9 cm and when the tile is glazed, rarely exceeds 0.95 cm, and is usually approximately 0.6 cm for ceramic mosaic type tile.

(the identical latter paragraph also appears in French patent No. 1,345,842), and:

Suitable types of resinous material for the web include epoxy resins, polyester resins, vinyl resins, such as polyvinyl chloride and polyvinylidene chloride, rubber, both natural and artificial, polyurethane resins, and the like.

and:

EXAMPLE 1

. . . Arrays of 20.3 × 20.3 cm. weighing 449 g and consisting of 2.38 × 2.38 × 0.63 cm. ceramic tile adhered to a pressure-sensitive masking paper were placed in metal trays with the paper surface down so that the open joints of the tile arrays were exposed. Using a caulking gun with a fine nozzle, the described epoxy resin adhesive composition was injected between the tile pieces to partially fill the open joints, thus obtaining a web bonding material which adhered to the edges of the tile and formed a finished grout surface while requiring only a fraction of the expensive epoxy material normally required to fill the joints when grouting is either accomplished after setting or when the joints are completely filled.

The resulting tile assembly were cured in an oven at 90° C. In this way, 20.3 × 20.3 cm. web-bonded tile panels containing about 18 grams of resin each were made.

and:

The tiles used to make the products disclosed herein may be vitreous, non-vitreous, semi-vitreous, or impervious opaque, transparent or translucent ceramic tile.

Nevertheless, it has not been possible to exploit industrially the processes proposed in the aforementioned two French patents for the manufacture of these panels, because of their price and because of the difficulty of manufacturing them.

In the French patent No. 1,290,058 it was, however, proposed to fill up the interstitial spaces between the units with a powder or with granules of a plastic substance then, by pressing the latter under heat, to obtain its fusion and thus, the joining of the units on a panel.

This latter patent (in translation) states:

On the contrary, the present invention permits work in only one step; it is indeed essentially characterized by the fact that the rubber or synthetic elastomer is pressed or flowed on the sheet of mosaic placed in a mold, the paper below. The rubber can be synthetic or natural; one can also use polyvinyl chloride, polyethylene, etc.; it is sufficient that the facing obtained remain flexible.

and:

1st Flexible mosaic facing obtained by direct application of an elastomer against the mosaic glued on paper and placed in a mold, the paper below.

and:

4th Procedure according to the 1st paragraph hereabove in which the application is made by the pressing and the heating of a powder or a granulation of thermoplastic synthetic material in a mold such that the synthetic material completely fills the joints and forms a layer with a small thickness on the back of the mosaic.

However, it was found that there were again, not only problems about the carrying out of the process, but also flaws in manufacturing, making the articles obtained unfit for commercialization. In particular, certain units became easily detached from the panel, especially during handling of the latter.

The object, therefore, of this invention is a new process for the manufacture of panels composed of units assembled and pre-joined by a thermoplastic material, this procedure being applicable no matter what may be the shape and the nature of the elements to be assembled.

According to the invention, once the units have been previously and suitably arranged on a support, the interstitial spaces are filled up with a granulous thermoplastic material and the whole is brought, preferably in an oven, to as high a temperature as possible, but just lower than the degradation temperature of the thermoplastic material.

At this time, the upper openings of the interstitial spaces must be in communication with the ambient air without the any interposition which could prevent the air from entering into contact with the plastic material in fusion. Furthermore, the time of maintenance of temperature will have to be sufficient (while at the same time depending on the quality and the nature of the plastic granules) so that the phenomena described later on, can develop properly. It would seem suitable to maintain the temperature for about half an hour.

The size of the grain of the thermoplastic material will be preferably lower than the average size of the interstitial spaces and will be near two thirds of this average dimension.

Although the procedure is applicable whatever the nature of the material constituting the units, according to the invention, the applicant has found two advantageous methods of application. The first case is that where the units show two flat sides, one being preferably polished, is intended to form the visible surface of the covering. The second concerns the units whose visible side is convex, and preferably enamelled or itself covered with some decoration or other.

In the first case, it is advantageous to stick the visible side of the units onto a temporary support such as sheet of paper, for example. This sheet, along with the units it supports, are then placed in a mould formed, basically, by a frame which is slightly removed from the lateral edges of the external units of the panel. The distance between the frame and the lateral edges of the external elements is preferably equal to the half of the interstitial space between the units, when the latter are square or rectangular shaped. It will be, generally speaking, about the same size as the interstitial spaces in such a way, that at the time of the constitution of the covering with the panels, the particular shape of the latter is also as little in evidence as possible.

The mould and the panel are both arranged on a table and we then proceed to filling up the interstitial spaces. In order to ensure a suitable filling up without the risk of leaving behind any granules of plastic matter on the upper side of the units, it is favourable to transmit vibrations to the table on which the sheet of paper supporting the units is placed, and even to put this table on a slight tilt in relation to the horizontal. We could also use a tangential current of air eliminating the excess granules. Under these conditions, a mere sprinkling of the units with the granules gives the desired result.

Still, in this first case, where the units have flat sides, we no longer are obliged to use the sheet of paper or something similar. For this purpose, the support for the units is coated with oil or some similar substance, preventing them from slipping too easily, while at the same time having no affinity whatsoever with the plastic in fusion. When the units have been properly arranged on this layer of oil (for example, by means of grids if it concerns units of regular shape, in particular square-shaped) we proceed to placing the mould, then to filling up the interstitial spaces and to the subsequent operations such as those described above.

When the thermoplastic material is brought to a sufficiently high temperature and also as near as possible to the degradation temperature, but lower than the latter, the granules melt and the thermoplastic material spreads out perfectly homogenously into all the interstitial spaces.

We then notice a very firm assemblage among the unit and this can result in several effects efficacious in a similar way.

First of all, on cooling, the thermoplastic material undergoes retraction which tends to bring the units close together.

More particularly, the binding material is compressed perpendicularly to the axial direction of an interstitial space since the units to be assembled do not themselves undergo any process of retraction.

On the other hand, we realized that the thermoplastic material fused at a temperature sufficiently close to its degradation temperature flows into the pores of the lateral sides of the units to be assembled. There is then a mechanical tie-up which is further reinforced by the existance of polar groups COOH, COH or CO in the binding substance.

In fact, because of the prolonged heating process and at a sufficiently elevated temperature of the thermoplastic material, there is first of all, a process of elimination of all the antioxidant products which materials of this type generally contain, then an oxidation of the polymer favouring the appearance of the aforementioned polar groups. These groups also contribute to the joining of the liaison substance on the rough parts of the units to be assembled.

When the panels are manufactured in the abovementioned way, their two sides are flat and bear no trace of the liason substance. Then it is easy, having eliminated, should the occasion arise, the temporary leaf support by washing, and then to fix them onto a slab or a wall with an appropriate adhesive. It must, however, be noticed that to make the sticking of the panel easier, it would be wise before the solidification of the thermoplastic material to sprinkle the panel with fine sand or any similar powdery substance. Besides this sprinkling can be introduced either before or after passing through the oven. Then there are asperities on the side of the joints intended to be in contact with the adhesive of the asperities favourizing the securing of the panel.

In the case of units having a convex side, it is suitable to proceed a little differently from the way which is described above, at least for the preparation of the panel before going through the oven or its maintenance at a high temperature.

The units are stuck by all the proper methods, onto a porous support, such as a gauze, their flat side being in contact with this porous support. On the table, or more often on the support of the panel during heating, we arrange a layer of plastic granules before placing the porous support and the units, convex side facing upwards. The layer of granules will not be very thick, about a few millimeters, for example, 5 mm, although this thickness depends on the volume of the interstitial spaces as will be realized later on. We then proceed to position the mould and to filling up the interstitial spaces, then to heat the plastic substace as was shown above.

During the course of fusion the plastic substance diminishes in volume so that it would tend not to reach the superior level of the interstitial spaces. However, thanks to the presence of the lower layer and the gauze, the plastic material rises in between the interstitial spaces up to the desired level. The wettability of the plastic material is besides increased at high temperature, which again makes both the securing of the units and the rise into the interstitial spaces easier.

We claim:

1. A process for making panels composed of units assembled and prejoined by a thermoplastic material comprising depositing the units on a support with interstitial spaces between them, heating the units well above the melting point range for said thermoplastic material to as about as high a temperature as possible but just lower than the degradation temperature of said thermoplastic material, said spaces being filled with said thermoplastic material in granular form, and maintaining said units and thermoplastic material at said temperature under oxidizing conditions for a time at least sufficient to fuse said material, wet said units with said fused material where in contact therewith, and cause oxidation of said thermoplastic material to form oxygen containing polar groups to further reinforce the binding of the thermoplastic material to said units.

2. A process according to claim 1, in which said units are ceramic tile.

3. A process according to claim 2, in which the heating is maintained at said temperature for at least one half an hour.

4. A process according to claim 3, in which said thermoplastic material is polyethylene.

5. A process according to claim 1, in which the heating is maintained at said temperature for at least one half an hour.

6. A process according to claim 5, wherein said spaces are filled with granular thermoplastic material prior to heating said units and said material is heated together with said units.

7. A process according to claim 6, in which the granular dimension of the thermoplastic material is less than the average dimension of the interstitial spaces.

8. A process according to claim 6, in which the units are stuck onto a temporary support by their face which will form the visible face of the panel, said support being eliminated after the heating.

9. A process according to claim 6, in which the units, having a convex face to form the visible face of the finished panel and having a smooth face, are stuck by their smooth face onto a porous support and the porous support is placed on a layer of thermoplastic material prior to heating.

10. A process according to claim 6, in which the support is caused to vibrate during the filling of the interstitial spaces.

11. A process according to claim 9, wherein said porous support is gauze.

12. A process according to claim 10, in which the support is inclined during the filling up of the interstitial spaces.

13. A process according to claim 6, in which the support is inclined during the filling up of the interstitial spaces.

14. A process according to claim 6, in which said units are ceramic tile.

15. A process according to claim 14, in which said thermoplastic material is polyethylene.

* * * * *